United States Patent [19]

Lubcke

[11] Patent Number: 4,610,052
[45] Date of Patent: Sep. 9, 1986

[54] SHELLFISH OPENING TOOL

[76] Inventor: Kip C. Lubcke, 277 Gemini Dr., 4C, Somerville, N.J. 08876

[21] Appl. No.: 740,385

[22] Filed: Jun. 3, 1985

Related U.S. Application Data

[63] Continuation-in-part of Ser. No. 733,889, May 14, 1985, abandoned.

[51] Int. Cl.$^4$ .............................................. A22C 29/04
[52] U.S. Cl. ............................................. 17/75; 30/299
[58] Field of Search ................... 17/66, 69, 71, 75; 30/299, 301

[56] References Cited

U.S. PATENT DOCUMENTS

| | | | |
|---|---|---|---|
| 46,159 | 7/1914 | Anderson | 30/301 X |
| 198,678 | 12/1887 | Poole | 30/123 X |
| 1,017,424 | 2/1912 | Kwiatkosky | . |
| 1,123,852 | 1/1915 | Costa | 30/120.3 |
| 2,058,072 | 10/1936 | Fiddyment | 30/120.3 |
| 2,218,607 | 10/1940 | Gantz | 30/120.3 |
| 2,472,354 | 6/1949 | Waters | . |
| 2,502,982 | 4/1950 | Norman | 30/299 X |
| 3,685,097 | 8/1972 | Scott et al. | 30/120.4 |
| 4,200,961 | 5/1980 | Mueller | 17/73 |
| 4,255,854 | 3/1981 | Bilbao | 30/299 X |

Primary Examiner—Willie G. Abercrombie
Attorney, Agent, or Firm—Richard S. Roberts

[57] ABSTRACT

A utensil suitable for use in opening shellfish casings in order to allow the meat thereof to be easily extracted. The utensil comprises a handle member which extends into a first elongated, substantially planar knife portion. Extending from said handle member is a second elongated, substantially planar knife portion which exists in a plane different from the plane of the first knife portion such that one edge of one knife portion is attached to one edge of the other knife portion such that the angle between the planes of the knife portions is about 90 degrees or less.

6 Claims, 3 Drawing Figures

SHELLFISH OPENING TOOL

CROSS REFERENCE TO RELATED APPLICATION

This application is a continuation-in-part of U.S. patent application Ser. No. 733,889 filed on May 14, 1985, now abandoned, which is incorporated herein by reference.

BACKGROUND OF THE INVENTION

The present invention relates to utensils capable of breaking the tough outer shell of shellfish such as lobsters, crabs and the like so that the meat thereof can be easily withdrawn so that the user experiences a reduction of undesired splattering of food juices. In present practice, shellfish are cracked by the use of nutcracker devices which compress the shell of the seafood item. This compressive action frequently causes the internal juices of the seafood to splatter in an undersirable fashion. Devices of this type are well known in the art and are representatively described in U.S. Pat. Nos. 198,678; 1,017,424; 1,123,852; 2,058,072; 2,218,607; 2,472,354; and 3,685,097. Each of the foregoing disclosures teach the use of variations on a tool which has two handles which extend to jaw members which are joined together to form a pivot. The user places the shellfish between the jaw members and squeezes the handles together. The seafood is thus compressed in this vise-like arrangement. U.S. Pat. No. 4,200,961 discloses a lobster fork which has a handle, a plurality of tines and a distinctive outermost claw tine wherein all of the aforesaid tines are in a common arcuate plane are parallel to one another. The present invention provides an improved shellfish cutting tool whereby two knife portions which are in different planes are connected at a common edge to form an angle therebetween.

SUMMARY OF THE INVENTION

The present invention provides a utensil suitable for cutting shellfish or the like which comprises a handle, a first substantially planar knife portion extending from said handle, and a second substantially planar knife portion extending from said handle; said first and second planar knife portions being joined at a common edge and having a slit partially through said edge. In the preferred embodiment the edges are joined such that the angle of said planes is about 90 degrees or less although angles of greater than 90 degrees are also within the purview of the invention.

DETAILED DESCRIPTION OF THE PREFERRED EMBODIMENT

Figure 1:
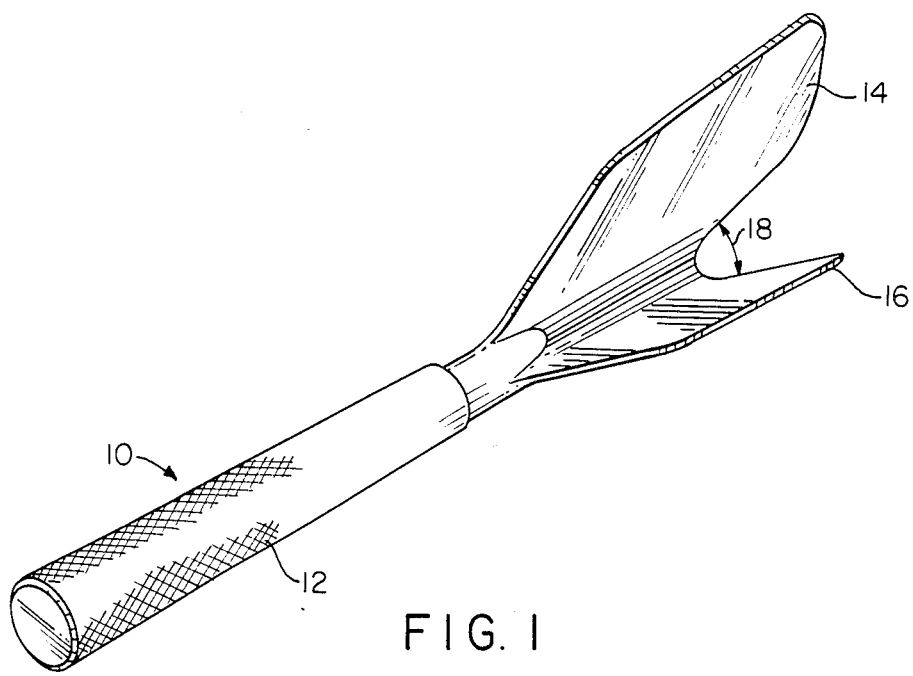
FIG. 1 is a perspective view of the utensil of the present invention.
Figure 2:
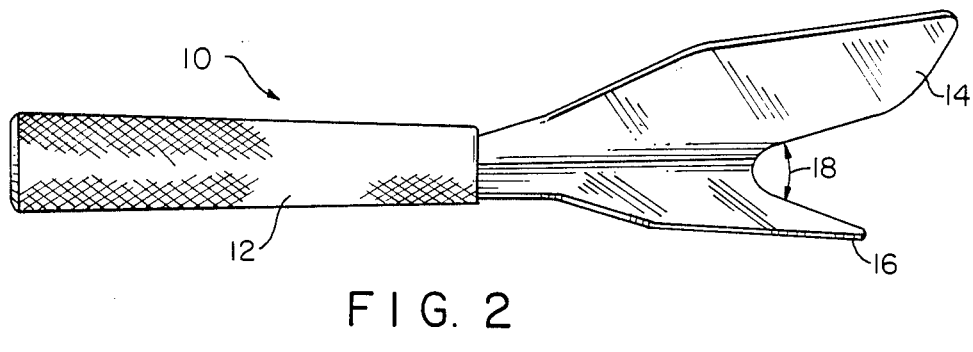
FIG. 2 is a plan view of the utensil of the present invention.
Figure 3:
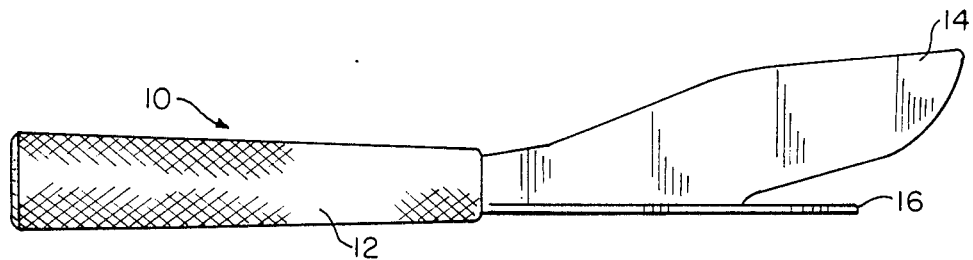
FIG. 3 is an elevational view of the utensil of the present invention.

With reference to the drawing figures, there is shown the utensil of the present invention 10, which is comprises a handle 12, a first substantially planar knife portion 14, and a second substantially planar knife portion 16. Knife portions 14 and 16 are joined such that the angle 18 between their planes is about 90 degrees or less. The utensil may be made of metal, plastic, wood or any other suitable material. In one preferred embodiment, the length of the second knife portion is less than the lenght of the first knife portion.

In use, the utensil is grasped by the handle by the user and knife portion 16 is inserted into the shell workpiece and knife portion 14 is outside the shell workpiece. In one method of operation the handle is used as a lever and knife portion 16 cuts up through the shell thus severing it. This prying action is then repeated as necessary across the shell. The knives may then also be employed to sever the meat membranes which attach themselves to the inside of the shell.

It is apparent that those skilled in the art may also make uses and modifications to the specific embodiment heretofore described without departing from the spirit and scope of the invention which is defined by the claims appended hereto.

What is claimed is:

1. A utensil suitable for cutting shellfish or the like which comprises a handle, a first substantially planar knife portion extending from said handle, and a second substantially planar knife portion extending from said handle; said first and second planar knife portions being joined so as to form an angle at a common edge and having a slit partially through said edge and said second planar knife portion having a cutting edge located on its side immediately adjacent said slit.

2. The utensil of claim 1 wherein said angle is 90 degrees.

3. The utensil of claim 1 wherein said angle is less than about 90 degrees.

4. The utensil of claim 1 wherein said angle is more than about 90 degrees.

5. The utensil of claim 1 wherein said second knife portion is shorter than said first knife portion.

6. The utensil of claim 1 which comprises one or more materials selected from the group consisting of metals, plastics and wood.

* * * * *